US012792842B2

(12) United States Patent
Cirne et al.

(10) Patent No.: US 12,792,842 B2

(45) Date of Patent: Nov. 10, 2026

(54) GENERATIVE AI ASSISTANT FOR A LOW-CODE PLATFORM

(71) Applicant: WORKDAY, INC., Pleasanton, CA (US)

(72) Inventors: Dalmo Cirne, Longmont, CO (US); Bryan Johnson, Elkhorn, NE (US); Yunxing Zhang, Fremont, CA (US); Volodymyr Tomenko, San Jose, CA (US); Alexander Gatto, Brooklyn, NY (US); Garrett Nelson, Pleasanton, CA (US); Sam Cannon, Tracy, CA (US); Mark Jaynes, Walnut Creek, CA (US)

(73) Assignee: WORKDAY, INC., Pleasanton, CA (US)

( * ) Notice: Subject to any disclaimer, the term of this patent is extended or adjusted under 35 U.S.C. 154(b) by 128 days.

(21) Appl. No.: 18/888,506

(22) Filed: Sep. 18, 2024

(65) Prior Publication Data

US 2026/0080180 A1 Mar. 19, 2026

(51) Int. Cl.
*G06F 40/35* (2020.01)
*G06F 16/334* (2025.01)

(52) U.S. Cl.
CPC .......... *G06F 40/35* (2020.01); *G06F 16/3344* (2019.01); *G06F 16/3347* (2019.01)

(58) Field of Classification Search
None
See application file for complete search history.

(56) References Cited

U.S. PATENT DOCUMENTS

| | | | | |
|---|---|---|---|---|
| 2020/0211541 | A1* | 7/2020 | Gupta | G10L 15/1815 |
| 2022/0261631 | A1* | 8/2022 | Cohen | G06N 3/0895 |
| 2023/0282218 | A1* | 9/2023 | Moynihan | G06F 16/433 704/235 |
| 2023/0385778 | A1* | 11/2023 | Johnson, III | G06Q 10/1093 |
| 2026/0080180 | A1* | 3/2026 | Cirne | G06F 40/216 |

OTHER PUBLICATIONS

Extended European Search Report to corresponding EP Appln. No. 25202862.6, mailed Feb. 5, 2026, 13 pages.

(Continued)

*Primary Examiner* — Peter Vincent Agustin

(74) *Attorney, Agent, or Firm* — James J. DeCarlo; Greenberg Traurig, LLP

(57) ABSTRACT

In some implementations, the techniques described herein relate to a method including: receiving, by a processor, a natural language input; retrieving, by the processor, a plurality of semantically relevant results based on the natural language input; classifying, by the processor, an intent of the natural language input using a first machine learning model; selecting, by the processor, a second machine learning model based on the intent; generating, by the processor, a prompt based on a type of the second machine learning model using the natural language input and the plurality of semantically relevant results. inputting, by the processor, to prompt into the second machine learning model; obtaining, by the processor, a result responsive to the prompt from the second machine learning model; and providing, by the processor, the result to the user.

20 Claims, 7 Drawing Sheets

(56) References Cited

OTHER PUBLICATIONS

Gu et al., "Plan, Generate and Match: Scientific Workflow Recommendation with Large Language Models," Service- Oriented Computing, 17 pages (2023).
Deng et al., "Assessing Code Generation with Intermediate Languages," 15 pages (2024).
Li et al., "AceCoder: An Effective Prompting Technique Specialized in Code Generation," ACM Transaction on Software Engineering and Methodology, 25 pages (2024).
Mollard et al., "2024 Future Computing Summer Internship at the Laboratory for Physical Scienses (LPS) Improving Retrieval Augmented Generation," 33 pages (2024).
Jiang et al., "A Survey on Large Language Models for Code Generation," 49 pages (2024).
Kuhn, "Method and System for Ramification Prediction and Large Language MOdel Selection," 9 pages (2024).
Shen et al., "HuggingGPT: Solving AI Tasks with ChatGPT and its Friends in Hugging Face," 27 pages (2023).

* cited by examiner

GENERATIVE AI ASSISTANT FOR A LOW-CODE PLATFORM

BACKGROUND

Low-code platforms for enterprise software development often rely on proprietary or forms-based programming languages and complex workflows, which can present technical challenges. Developers may face steep learning curves due to unfamiliar tools and resources, leading to productivity bottlenecks. The platforms may lack intuitive interfaces, imperative programming language, and natural language processing capabilities, resulting in usability issues. Integrating low-code platforms with existing systems and data sources can also be complex. Additionally, the proprietary nature of some low-code platforms can create challenges around vendor lock-in, customization, scalability, and performance.

DETAILED DESCRIPTION

Figure 1:
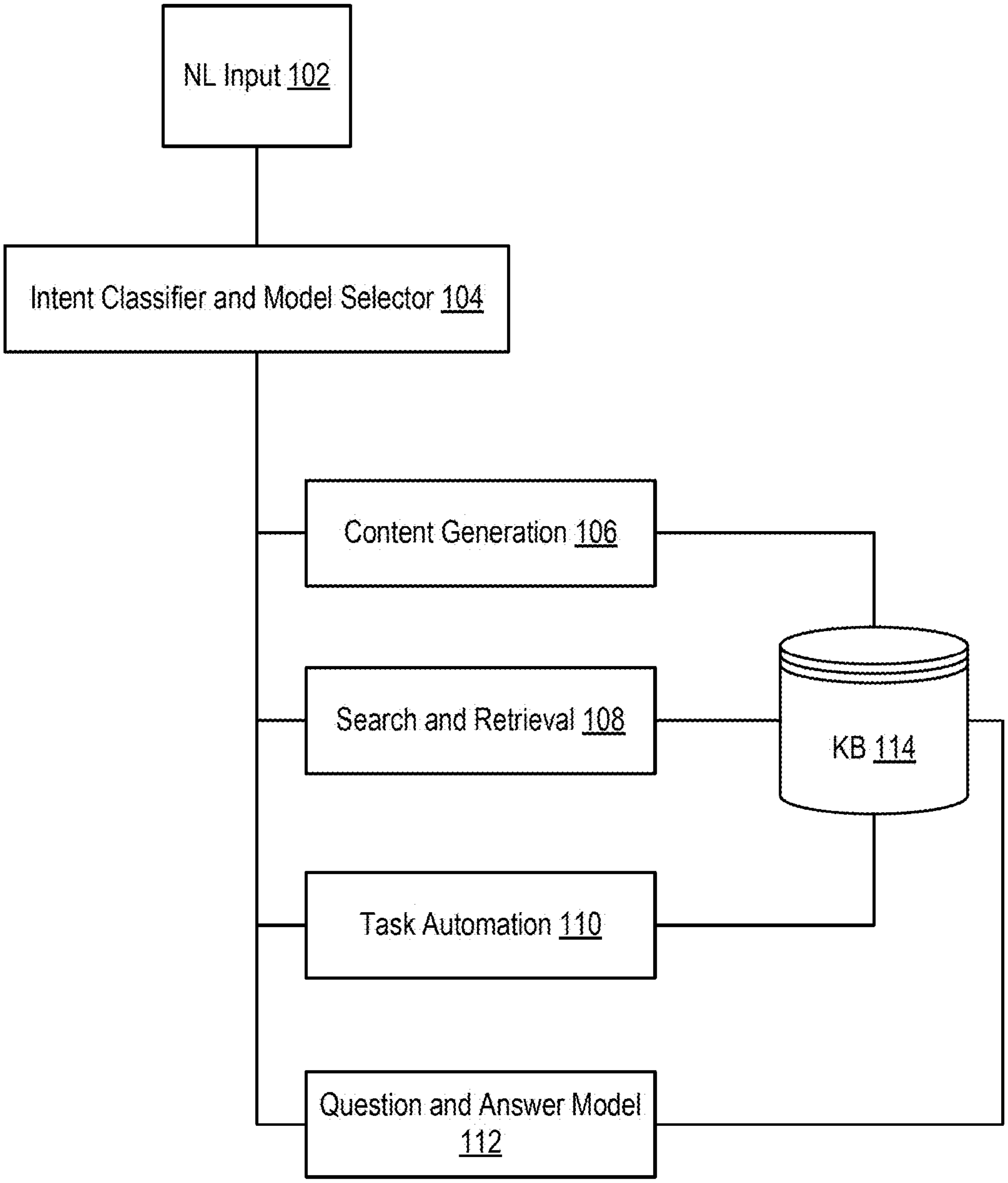
FIG. 1 is a block diagram illustrating an example system architecture for a generative artificial intelligence assistant according to some implementations.

In some implementations, the techniques described herein relate to a method including: receiving, by a processor, a natural language input; retrieving, by the processor, a plurality of semantically relevant results based on the natural language input; classifying, by the processor, an intent of the natural language input using a first machine learning model; selecting, by the processor, a second machine learning model based on the intent; generating, by the processor, a prompt based on a type of the second machine learning model using the natural language input and the plurality of semantically relevant results. inputting, by the processor, to prompt into the second machine learning model; obtaining, by the processor, a result responsive to the prompt from the second machine learning model; and providing, by the processor, the result to the user.

In some implementations, the techniques described herein relate to a method, wherein the second machine learning model is selected from a group consisting of a content generation model, a search and retrieval model, a questions and answers model, and a task automation model.

In some implementations, the techniques described herein relate to a method, wherein the second machine learning model is a content generation model, and wherein processing the conversation using the content generation model includes: retrieving content using a retrieval-augmented generation (RAG) vector database, then forwarding to a large language model, the content associated with a target language, the target language including a form-based programming language; generating an intermediate representation of the content; and transpiling the intermediate representation to the target language.

In some implementations, the techniques described herein relate to a method, wherein transpiling the intermediate representation to the target language includes converting the intermediate representation into syntax and semantics of a proprietary language.

In some implementations, the techniques described herein relate to a method, wherein processing the conversation using the search includes: parsing a query provided by the user; expanding the query using semantically similar terms using word embeddings and ontology-based expansion; retrieving relevant information based on the query using a vector proximity search algorithm; and ranking the relevant information if the relevant information is sufficient.

In some implementations, the techniques described herein relate to a method, wherein expanding the query includes identifying relevant terms and concepts based on the query and a knowledge base, and wherein ranking the relevant information includes applying a ranking algorithm to prioritize the relevant information based on relevance to one or more of the query, user context, and information quality.

In some implementations, the techniques described herein relate to a method, wherein the second machine learning model is a task automation model, and wherein processing the conversation using the task automation model includes: parsing a task request provided by the user; identifying a task to be automated based on the task request using one or more of semantic similarity matching, rule-based parsing, or machine learning-based classification to match the task request to predefined task templates or workflows; retrieving data required for executing the task; and executing an automated workflow based on the task, data, and at least one integration with a backend system.

In some implementations, the techniques described herein relate to a method, wherein identifying the task to be automated includes matching the task request with predefined task templates or workflows stored in a knowledge base, and wherein executing the automated workflow includes orchestrating a series of steps, including data retrieval, data manipulation, conditional logic, and system interactions.

In some implementations, the techniques described herein further relate to devices for performing the above methods and non-transitory computer-readable storage media for tangibly storing computer program instructions capable of being executed by a computer processor, the computer program instructions defining steps of the aforementioned methods.

FIG. 1 is a block diagram illustrating an example system architecture for a generative artificial intelligence assistant according to some implementations.

In some implementations, the system can include a natural language input component 102, an intent classifier and model selector component 104, a content generation component 106, a search and retrieval component 108, a task automation component 110, a questions and answers model 112, and a knowledge base 114.

In some implementations, the natural language input component 102 is configured to receive user input in natural language form. The NL input can be provided as text, voice, or any other suitable format. In some implementations, the natural language input component 102 can include speech-to-text functionality to convert spoken user input into text for further processing. In some implementations, the natural language input component 102 can operate as the primary interface for users to interact with the generative AI assistant.

In some implementations, the intent classifier and model selector component 104 can be communicatively coupled to the natural language input component 102. In some implementations, the intent classifier and model selector component 104 can be configured to analyze the NL input to determine the user's intent and select the appropriate downstream model for handling the request. In some implementations, the intent classifier can utilize machine learning techniques such as natural language processing, text classification, and semantic analysis to categorize the user's input into predefined intent categories. This categorization can allow the system to route the user's request to the most suitable downstream model for processing.

Based on the classified intent, the intent classifier and model selector component 104 can route the request to one of the downstream models, which include the content generation component 106, search and retrieval component 108, and task automation component 110. In some implementations, each downstream model can specialize in a specific type of task and is optimized for that purpose. The modular architecture allows for the addition of new downstream models as needed, providing extensibility and scalability to the system.

In some implementations, the content generation component 106 is designed to generate various types of content based on user requests, such as code snippets, reports, or documentation. In some implementations, the content generation component 106 can utilize large language models (LLMs) that have been fine-tuned on domain-specific data, including proprietary forms-based programming languages and application-specific query languages. In some implementations, the content generation component 106 may employ techniques like retrieval-augmented generation (RAG), few-shot learning, and prompt engineering to guide the LLM in generating relevant and accurate content. In some implementations, the content generation component 106 may interact with an intermediate representation layer to facilitate the generation of code in non-textual, graph-based languages. In some implementations, this intermediate representation can then be transpiled into the target programming language using language-specific integration components.

In some implementations, the search and retrieval component 108 can handle user queries that require information retrieval from the knowledge base 114. In some implementations, the search and retrieval component 108 can employ techniques such as semantic search, vector proximity, document retrieval, question-answering, and information extraction to locate relevant information within the knowledge base 114. In some implementations, the search and retrieval component 108 may utilize advanced indexing and ranking algorithms to ensure the most pertinent information is retrieved based on the user's query.

In some implementations, the task automation component 110 can handle user requests related to workflow automation and task execution within the target application. The task automation component 110 may employ techniques such as workflow orchestration and API integration to automate tasks and streamline processes. In some implementations, the task automation component 110 may generate and execute code in proprietary programming languages, leveraging language-specific integration components to interact with the target application.

In some implementations, the system can further include a questions and answers model 112 which specializes in providing direct answers to user queries. This model works in conjunction with the RAG system and the other components to offer precise responses to specific questions. When the intent classifier determines that the user's input is a question seeking a factual answer, it routes the request to the questions and answers model 112. This model leverages the content retrieved by the RAG system, combining it with its own trained knowledge to formulate accurate answers. The questions and answers model 112 is particularly adept at handling queries that require concise, fact-based responses, such as definitions, historical facts, or specific data points within the domain of the low-code platform. Like the other models in the system, it receives a carefully constructed prompt that includes the user's question, relevant context from the RAG system, and instructions on how to format the answer. The output of this model undergoes post-processing to ensure clarity and relevance before being presented to the user. By incorporating this specialized model, the system enhances its capability to provide direct, accurate answers to user questions, complementing the broader content generation and task automation features of the other components.

In some implementations, the system can include an optional conversational agent can facilitate natural language interaction between the user and the generative AI assistant. In some implementations, the conversational agent can be powered by a dialog management system that can maintain context across multiple turns of conversation, handle ambiguity, and provide clarification when needed. In some implementations, the conversational agent may employ techniques like intent recognition, entity extraction, and sentiment analysis to understand the user's input and provide relevant responses. In some implementations, the conversational agent can provide a unified interface for the user to access the capabilities of the content generation component 106, search and retrieval component 108, and task automation component 110.

In some implementations, the conversational agent can provide a user-friendly interface for interacting with the generative AI assistant. In some implementations, a chat interface can be designed to be intuitive and responsive, allowing users to engage in natural language conversations with the system. The conversational agent employs natural language generation techniques to craft human-like responses that are contextually relevant and easy to understand. When presenting results, the system can use rich formatting options like markdown, tables, or images to enhance the readability and usability of the information. The conversational flow is designed to handle multi-turn interactions, where the system maintains context across multiple user requests and provides coherent and consistent responses. The system also includes error handling mechanisms to gracefully handle unexpected inputs or system failures and provide appropriate feedback to the user. For example, if the system encounters an ambiguous or incomplete request, it can prompt the user for clarification or additional information to ensure accurate understanding and processing of the request.

In some implementations, the knowledge base 114 serves as a central repository for storing and retrieving various types of data used by the content generation component 106, search and retrieval component 108, and task automation component 110. In some implementations, the knowledge base 114 is populated with data from diverse sources, such as technical documentation, code repositories, user manuals, support forums, and application-specific data. The knowledge base 114 may employ techniques like data ingestion, indexing, versioning, and knowledge graph construction to ensure the stored information is well-structured, up-to-date, and easily accessible. The knowledge base 114 enables the generative AI assistant to provide accurate and contextually relevant information to the user.

In some implementations, the knowledge base 114 can incorporate a knowledge graph that organizes and represents the domain-specific knowledge and relationships. In some implementations, the knowledge graph can be constructed by extracting and integrating information from various data sources, such as technical documentation, code repositories, user manuals, support forums, and user feedback. The extracted information is structured using an ontology or schema that defines the key entities, attributes, and relationships within the domain. For example, the ontology may include entities like "employee," "expense report," "approval workflow," and "financial transaction," along with their associated properties and relationships. In some implementations, the system can employ techniques such as named entity recognition, semantic parsing, and relationship extraction to identify and link the relevant entities and relationships from the unstructured data sources. In some implementations, the knowledge graph can be continuously updated and expanded as new information becomes available, ensuring that the generative AI assistant has access to the most up-to-date and comprehensive knowledge for its operations. In some implementations, the knowledge graph can be utilized in various components of the system, such as the search and retrieval component 300B, where it aids in query expansion and semantic search, and the content generation component 300A, where it provides context and domain-specific information for generating accurate and relevant content. The task automation component 300C also leverages the knowledge graph to identify the required steps, data inputs, and outputs for automating specific tasks based on the relationships and constraints encoded in the graph. Details of these components are provided in the description herein and are not repeated in detail or the sake of clarity.

By integrating these components, the generative AI assistant system can provide an interface for users to interact with complex applications using natural language. The system abstracts away the intricacies of the underlying programming languages and data structures, empowering users to efficiently complete tasks, access information, and generate content. The modular architecture allows for the seamless integration of new capabilities and downstream models, ensuring the system can adapt to the evolving needs of the user and the target application. Further structure and functional details are provided in the following figures.

Figure 2:
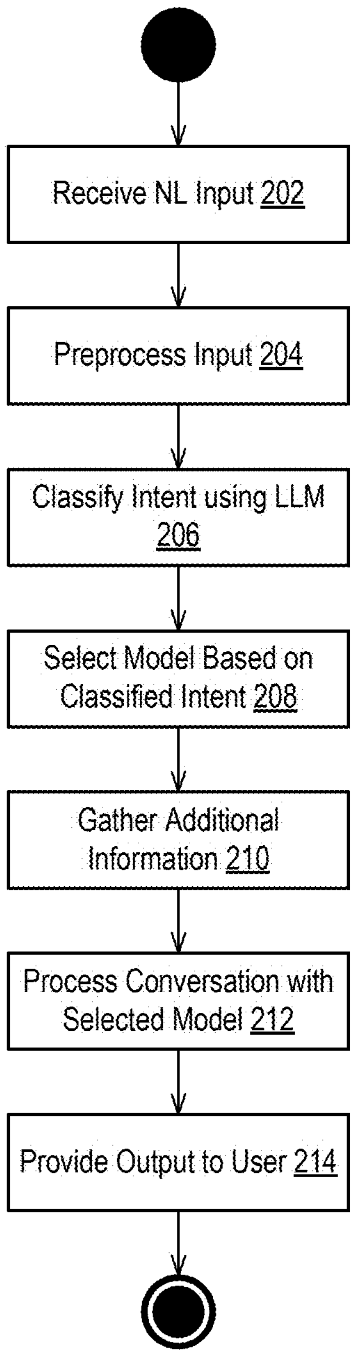
FIG. 2 is a flow diagram illustrating a method for processing user requests using a generative artificial intelligence assistant according to some implementations.

FIG. 2 is a flow diagram illustrating a method for processing user requests using a generative artificial intelligence assistant according to some implementations.

In step 202, the method receives natural language input from the user. In some implementations, the natural language input can be provided as text, such as through a chat interface or a text input field. In other implementations, the natural language input can be provided as speech, which is then converted into text using speech-to-text techniques. The natural language input represents the user's request or query, expressed in their own words.

In step 204, the method preprocesses the received natural language input. Preprocessing can include various techniques to clean and normalize the input data. Tokenization involves breaking down the input text into individual words or subwords. Lowercasing, removing punctuation, and removing stop words (common words that do not contribute much to the meaning, such as "the" or "and") may also be applied. In some implementations, lemmatization or stemming reduces words to their base or root form. The preprocessed input is then ready for further analysis.

In step 206, the method classifies the intent of the user's request using an LLM. The LLM, a deep learning model trained on a large corpus of text data, understands and generates human-like language. Fine-tuning the LLM on a dataset of annotated user queries, where each query is labeled with its corresponding intent, allows it to predict the most likely intent based on learned patterns. Common intents include information retrieval, content generation, task automation, and more.

In step 208, the method selects a specific model based on the classified intent. Each intent is associated with a specialized model designed to handle requests of that particular type. For example, the content generation model is selected for content generation intents, while the search and retrieval model is chosen for information retrieval intents. In some implementations, a single generalist model can handle multiple intents, while in others, multiple specialized models exist for each intent, with the most appropriate one selected based on additional criteria.

In step 210, the method gathers additional information from the user through the conversation. The user provides more details about their request in response to the prompts, including specific parameters, constraints, or preferences relevant to their request. Follow-up questions are asked to clarify any ambiguous or missing information.

In step 212, the method processes the conversation with the selected model. The model receives the preprocessed user input and any additional information gathered during the conversation. It then performs its specific task based on the input, such as generating requested content, retrieving relevant information from a knowledge base, or executing necessary actions for task automation.

In step 214, the method provides the output to the user. The output, the result of processing the user's request with the selected model, can be generated content, retrieved information, or a confirmation of an automated task. It is presented to the user through the conversational AI interface, completing the interaction. The output may be formatted in a user-friendly way, such as using markdown for code snippets or tables for structured data.

The generative AI assistant is designed to handle ambiguity, incomplete information, and the need for clarification within the conversational flow. Slot filling is employed to gather missing information by identifying key entities or parameters required for a specific task or query and prompting the user to provide the missing values. Disambiguation questions are used to clarify the user's intent when there are multiple possible interpretations of a request. By engaging in these clarification dialogues, the system ensures it has the necessary information to accurately understand and process the user's request, reducing the risk of errors or misinterpretations.

By following these steps, the method enables users to interact with a generative AI assistant using natural language, making it easier for them to access information, generate content, and automate tasks within a specific domain. The LLM for intent classification allows accurate understanding of the user's intent, while specialized models provide targeted and efficient processing of different request types. The conversational AI component ensures a smooth and intuitive user experience by guiding the user and gathering necessary information through a natural dialog. This method streamlines the process of handling user requests and provides a powerful and user-friendly interface for interacting with a generative AI system.

Figure 3:
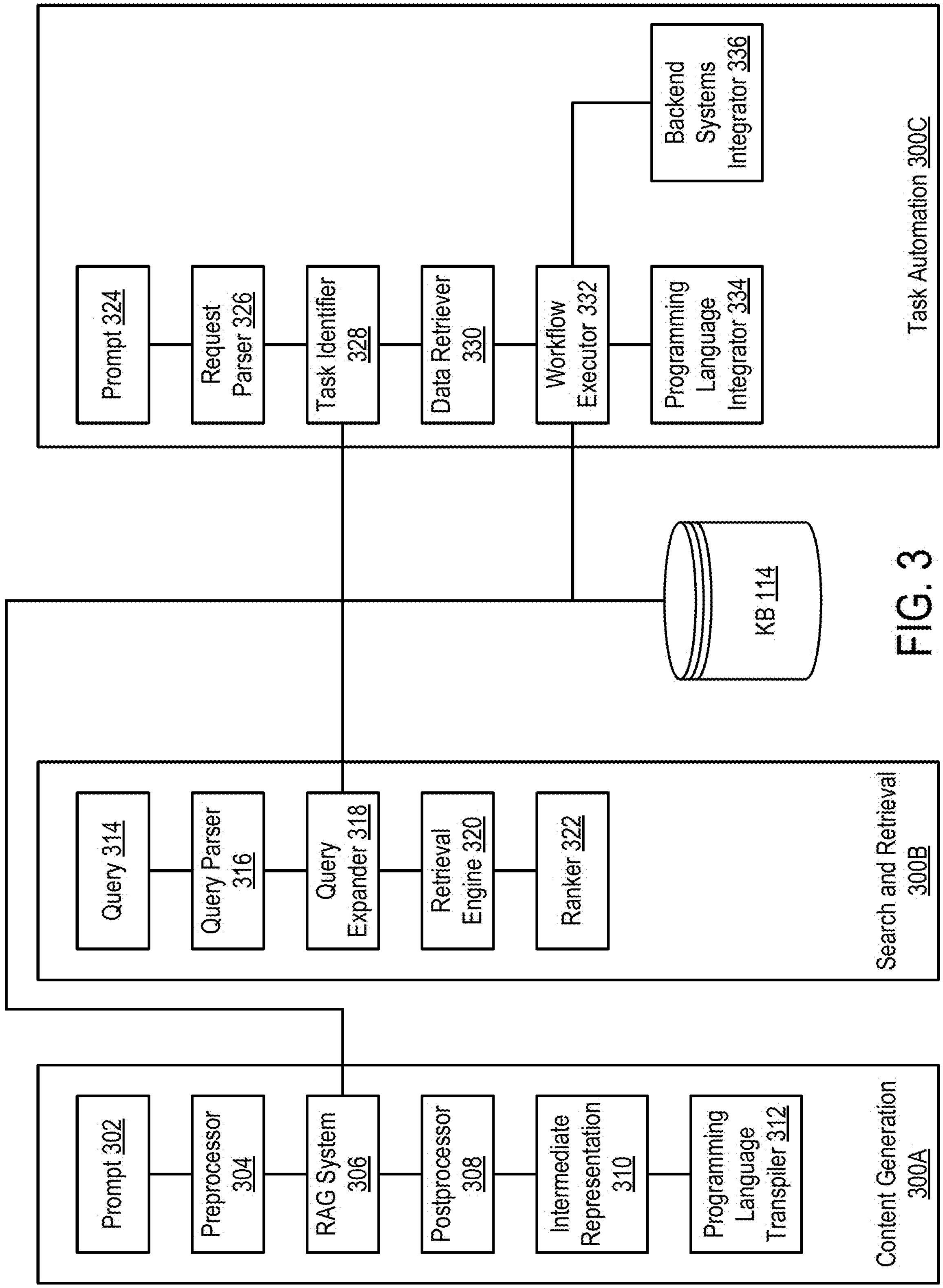
FIG. 3 is a block diagram illustrating a plurality of large-language model-backed models supporting a generative AI assistant according to some implementations.

FIG. 3 is a block diagram illustrating a plurality of LLM-backed models supporting a generative AI assistant according to some implementations.

FIG. 3 illustrates the downstream models of the generative AI assistant according to some embodiments, including the content generation component 300A, search and retrieval component 300B, and task automation component 300C.

The content generation component 300A generates various types of content, such as code snippets, reports, and documentation, based on user prompts. The prompt 302 represents the natural language input provided by the user, as described in FIG. 1. The preprocessor 304 performs tasks such as formatting, templating, and other necessary transformations to prepare the input for further processing.

The preprocessed prompt is fed into the RAG system 306, which retrieves semantically relevant data that forms the core of the content generation component 300A. The RAG system 306, a large language model utilizing RAG techniques for prompt generation, generates contextually relevant content by retrieving relevant information from the knowledge base 114 based on the input prompt and incorporating that information into the generation process by augmenting the prompt with semantically similar results. This allows the LLM to produce more accurate and informative content by leveraging the domain-specific knowledge stored in the knowledge base 114.

For instance, a user may generate an input prompt that is designed to find a method that "computes 2+2." In the illustrated system, a RAG system (e.g., via a vector database) can return methods such as "add(a, b)", "sum(a, b)", "addition(a, b)," and so on which are stored as vectorized documents in the vector database. In this case the semantic meaning of the plus sign "+" in the input prompt is similar to "add," "sum," and "addition." Thus, the use of a RAG system enables the identification of semantically similar results for a given input prompt.

The retrieved content from the RAG system 306 undergoes postprocessing in the postprocessor 308 to ensure that the output meets the required format and quality standards. This may involve tasks such as formatting, error checking, and other necessary transformations. For example, the semantically similar content retrieved by the RAG system is processed (i.e., cleaned, formatted), then inserted into the original input prompt. Thus, the final prompt will contain the original input from the user, the content retrieved by the RAG system, and instructions of what to do (which may be pre-defined template text). The following example prompt, which is non-limiting, is provided as an example of such a prompt template. In the following prompt example, the LLM is being instructed to answer a question provided by the variable {user_question} (corresponding to the input prompt) and to consider the content provided by the {rag_context} variable (corresponding to the semantically similar RAG system results):

Answer the QUESTION based on the CONTEXT given.
If you do not know the answer and cannot find the answer in CONTEXT, say "I don't know."
QUESTION:
{user_question}
CONTEXT:
{rag_context}
ANSWER:

During runtime, the variables above will be populated with the question from the user (i.e., the original input prompt) and the content retrieved by the RAG system. As illustrated, the prompt may end with a completion prefix or response delimiter which allows the LLM cue the LLM to generate its response.

In some cases, the generated content may need to be expressed in a proprietary or non-standard programming language used within the low-code platform. The content generation component 300A includes an intermediate representation 310 and a programming language transpiler 312 to address this. The intermediate representation 310 acts as a bridge between the generated content and the target programming language, providing a more amenable format for the LLM to generate code. The programming language transpiler 312 then converts the intermediate representation into the final code in the target language.

The inclusion of the intermediate representation 310 and programming language transpiler 312 allows the content generation component 300A to generate code in a wider range of languages, including those not directly supported by standard language models. This flexibility enables the generative AI assistant to integrate seamlessly with the low-code platform and provide code generation capabilities tailored to the platform's specific requirements.

The search and retrieval component 300B allows users to access relevant information quickly and accurately within the low-code platform. The query 314 represents the natural language search query provided by the user, as described in FIG. 1. The query parser 316 analyzes the query and extracts key information, such as entities, relationships, and intent, employing sophisticated natural language understanding algorithms to interpret the user's query accurately.

The parsed query is processed by the query expander 318, which enhances the query by incorporating synonyms, semantic similar terms, and domain-specific knowledge from the knowledge base 114. The query expander 318 employs various techniques for query expansion and retrieval to improve the relevance and comprehensiveness of search results, such as leveraging word embeddings, ontology-based expansion, Boolean queries, term weighting schemes like TF-IDF, vector proximity, and semantic search algorithms.

The expanded query is passed to the retrieval engine 320, which searches the knowledge base 114 for relevant information using advanced indexing and retrieval techniques. The retrieval process takes into account factors such as semantic similarity, user context relevance, and overall popularity or importance of the information within the low-code platform.

The retrieved results are processed by the ranker 322, which applies sophisticated ranking algorithms to prioritize the most relevant and useful information for the user. The ranker 322 considers factors such as semantic similarity, user context relevance, and overall quality and reliability of the information.

The task automation component 300C streamlines and automates complex workflows within the low-code platform. The prompt 324 represents the natural language description of the task provided by the user, as described in FIG. 1. The request parser 326 analyzes the prompt and extracts key information using advanced natural language understanding techniques.

The parsed request is processed by the task identifier 328, which determines the specific task or workflow to be automated based on the user's input, leveraging the knowledge base 114 to match the parsed request with predefined task templates or workflows. The data retriever 330 gathers the necessary data and resources required to execute the task from the knowledge base 114.

The workflow executor 332 orchestrates the various steps involved in the task, leveraging the platform language integrator 334 and the backend systems integrator 336 to seamlessly integrate with the platform's proprietary tools and systems. The platform language integrator 334 enables interaction with the low-code platform's proprietary programming language, while the backend systems integrator 336 facilitates integration with various backend systems and databases within the platform.

The modular architecture of the generative AI assistant allows for scalability and extensibility as the system evolves and new requirements emerge. The downstream models are designed as independent modules that can be added, updated, or replaced without affecting the overall system functionality. The knowledge base 114 is also extensible, allowing for the continuous incorporation of new data sources and the expansion of domain-specific knowledge over time.

Figure 4:
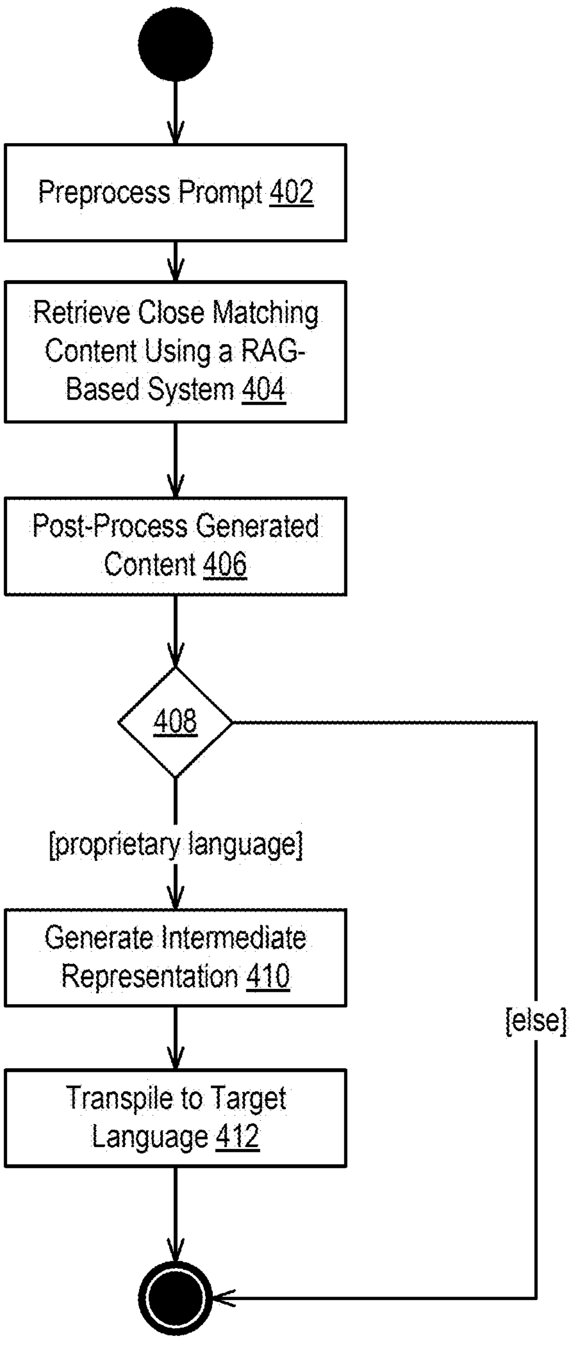
FIG. 4 is a flow diagram illustrating a method for generating content using a content generation component of the generative AI assistant according to some implementations.

FIG. 4 is a flow diagram illustrating a method for generating content using a content generation component of the generative AI assistant according to some implementations.

In step 402, the method preprocesses the prompt received from the user. The prompt represents the natural language input provided by the user, as described in FIG. 1 and FIG. 3. Preprocessing the prompt involves applying various techniques to clean, normalize, and transform the input data into a format suitable for the RAG system. Tokenization involves breaking down the input text into individual words or subwords. Lowercasing, removing punctuation, removing formatting tags (common tags include "<a>", "<div>", and "<q>"), and removing stop words (common words that do not contribute much to the meaning, such as "the" or "and") may also be applied. In some implementations, lemmatization or stemming reduces words to their base or root form. Additionally, preprocessing may involve formatting the prompt according to predefined templates or structures that the LLM is trained to understand and generate from.

In step 404, the method retrieves content using a RAG system. The RAG system retrieves relevant content based on the preprocessed input prompt by retrieving relevant information from the knowledge base 114 and incorporating that information into the generation process. This allows the LLM to produce more accurate and informative content by leveraging the domain-specific knowledge stored in the knowledge base 114. The LLM used is a deep neural network trained on a large corpus of text data. It consists of an encoder that processes the input prompt and a decoder that generates the content. The encoder and decoder are typically based on transformer architectures, such as BERT or GPT, designed to capture long-range dependencies and contextual information in the input sequence. During the generation process, the LLM attends to relevant information retrieved from the knowledge base 114, allowing it to incorporate domain-specific knowledge and generate more coherent and factually accurate content. As discussed in connection with FIG. 3, which is not repeated herein, the method may include augmenting the pre-processed input prompt with results from the RAG system to improve the accuracy of the LLM output.

In step 406, the method postprocesses the generated content. Postprocessing involves applying various techniques to refine and optimize the generated content for the target use case. Formatting the generated content according to predefined templates or styles, such as code formatting conventions or documentation structures, may be applied. Postprocessing may also involve removing irrelevant or redundant information, correcting grammatical or syntactical errors, and ensuring the generated content meets the required length and structure. In some implementations, postprocessing can include applying domain-specific rules or constraints to the generated content, such as validating the syntax of generated code snippets or checking the consistency of generated reports with the platform's data model.

In step 408, the method determines if the target language for the generated content is a proprietary language. If the target language is a proprietary language, the method proceeds to step 410 to generate an intermediate representation of the content. If the target language is not a proprietary language, the method proceeds to step 412 to transpile the content directly to the target language.

In step 410, the method generates an intermediate representation of the content.

The intermediate representation serves as a bridge between the generated content and the proprietary language, providing a more amenable format for the LLM to generate code by abstracting away the complexities and constraints of the proprietary language. In some implementations, the intermediate representation can be a high-level, human-readable representation that captures the essential structure and logic of the content, using a simplified syntax and semantics that are easier for the LLM to generate and manipulate. By generating an intermediate representation, the method enables the content generation component to support a wider range of proprietary languages without requiring the LLM to directly generate code in those languages.

In step 412, the method transpiles the intermediate representation to the target language. Transpilation involves converting the intermediate representation into the syntax and semantics of the proprietary language by applying a set of predefined rules and mappings. In some implementations, the transpilation process may involve parsing the intermediate representation, constructing an abstract syntax tree (AST), and performing a series of transformations on the AST to generate the final code. The transpilation process may also include optimizations and code generation techniques specific to the target language to ensure the generated code is efficient and idiomatic.

By incorporating the intermediate representation and transpilation steps (step 410 and step 412), the method enables the generative AI assistant to support a wide range of proprietary languages and non-standard programming paradigms. This flexibility allows the assistant to integrate seamlessly with the low-code platform and generate content that adheres to the platform's specific requirements and conventions. The intermediate representation acts as a common language that the LLM can generate, while the transpilation process handles the conversion to the target proprietary language.

The method described in FIG. 4 provides a powerful and adaptable approach to generating contextually relevant content within the low-code platform. By leveraging the RAG system and the knowledge base 114, the method can generate accurate and informative content that meets the user's specific needs. The preprocessing, postprocessing, and language-specific steps ensure that the generated content is well-structured, error-free, and compatible with the platform's requirements. This method streamlines the content generation process and empowers users to quickly obtain the information and artifacts they need to build and manage applications within the low-code platform.

Figure 5:
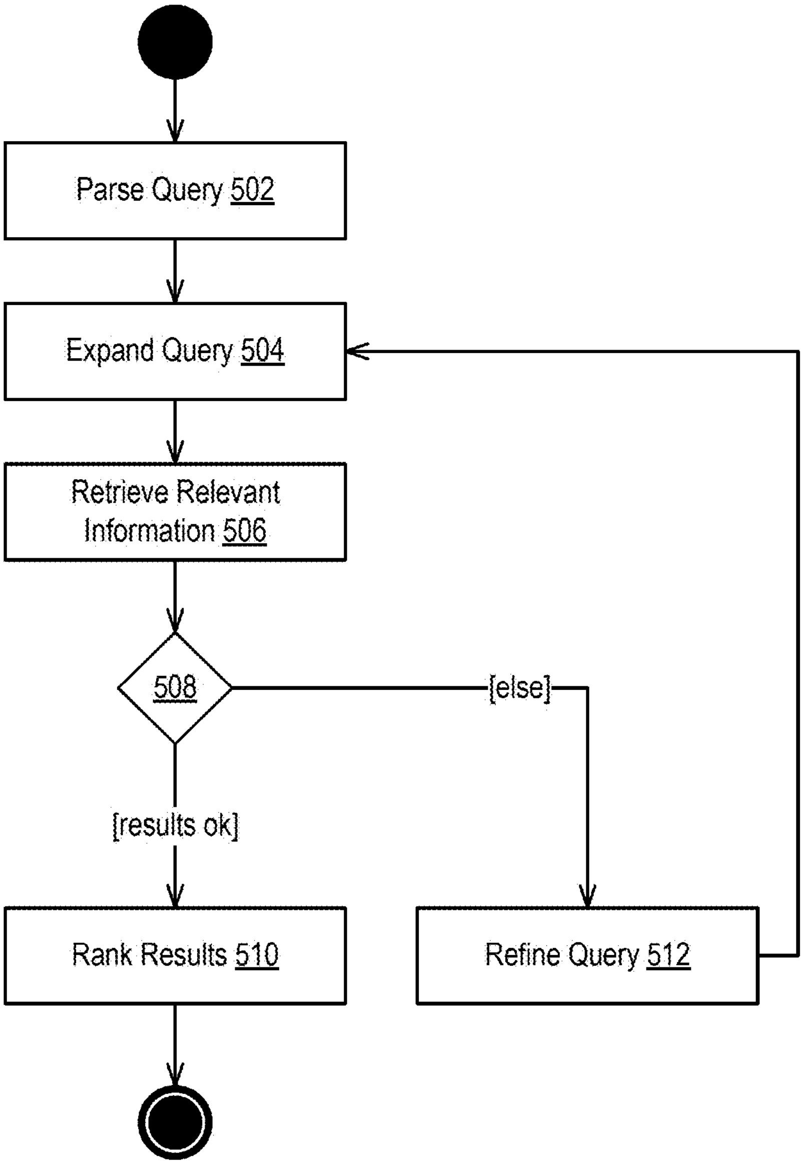
FIG. 5 is a flow diagram illustrating a method for searching and retrieving information using the search and retrieval component of the generative AI assistant according to some implementations.

FIG. 5 is a flow diagram illustrating a method for searching and retrieving information using the search and retrieval component of the generative AI assistant according to some implementations.

In step 502, the method parses the query received from the user. The query represents the natural language search query provided by the user, as described in FIG. 1 and FIG. 3. Parsing the query involves analyzing the query and extracting key information, such as entities, relationships, and intent. The query parser 316 employed in this step utilizes advanced natural language understanding algorithms to interpret the user's query accurately, taking into account the domain-specific terminology and context. In some implementations, the query parser 316 may employ techniques such as tokenization, part-of-speech tagging, named entity recognition, and dependency parsing to extract the relevant information from the query. The parsed query provides a structured representation of the user's information need, which is used in subsequent steps to retrieve relevant information.

In step 504, the method expands the parsed query. Query expansion is a technique used to enhance the original query by incorporating additional terms, synonyms, or semantic similar concepts. The query expander 318 utilized in this step leverages the knowledge base 114 to identify relevant terms and concepts based on the parsed query. The knowledge base 114 contains a rich collection of domain-specific information, including terminology, synonyms, and semantic relationships. By expanding the query with related terms and concepts, the method increases the chances of retrieving relevant information that may not have been explicitly mentioned in the original query. In some implementations, the query expander 318 may employ techniques such as synonym expansion, concept expansion, or co-occurrence analysis to identify the most relevant terms to include in the expanded query.

In step 506, the method retrieves relevant information based on the expanded query. The retrieval engine 320 used in this step searches the knowledge base 114 for information that matches the expanded query. The knowledge base 114 is a comprehensive repository of domain-specific information, including documents, code snippets, best practices, and frequently asked questions. The retrieval engine 320 employs advanced indexing and retrieval techniques to efficiently identify the most relevant information based on the expanded query. In some implementations, the retrieval engine 320 may utilize techniques such as inverted indexing, term frequency-inverse document frequency (TF-IDF) weighting, or semantic similarity measures to determine the relevance of each piece of information to the query. The retrieved information is then passed on to the next step for further processing.

In step 508, the method determines if the retrieved results are sufficient to satisfy the user's information need. This determination is made based on various factors, such as the number of retrieved results, the relevance scores of the results, and predefined threshold values. If the retrieved results are deemed sufficient, the method proceeds to step 510 to rank the results. If the retrieved results are not sufficient, the method proceeds to step 512 to refine the query.

In step 510, the method ranks the retrieved results based on their relevance to the query. The ranker 322 employed in this step applies sophisticated ranking algorithms to prioritize the most relevant and useful information for the user. The ranking process takes into account various factors, such as the semantic similarity between the query and the content, the relevance of the information to the user's context, and the overall quality and reliability of the information. In some implementations, the ranker 322 may utilize machine learning techniques, such as learning-to-rank algorithms, to learn the optimal ranking function based on user feedback and interaction data. The ranked results are then presented to the user in a structured and easily accessible format, enabling them to quickly find the information they need.

In step 512, the method refines the query if the retrieved results are not sufficient. Query refinement involves modifying or reformulating the query to improve the relevance of the retrieved results. The refinement process may involve techniques such as query expansion, query reformulation, or relevance feedback. In some implementations, the method may prompt the user for additional information or clarification to better understand their information need. The refined query is then fed back into the retrieval process (step 506) to obtain more relevant results. The query refinement process may be repeated iteratively until satisfactory results are obtained or a maximum number of iterations is reached.

The search and retrieval method described in FIG. 5 provides a powerful and efficient approach to searching and retrieving relevant information within the low-code platform. By leveraging advanced natural language processing techniques, domain-specific knowledge, and sophisticated retrieval and ranking algorithms, the method enables users to quickly access the information they need to develop and manage applications effectively. The query expansion and refinement steps ensure that the retrieved results are highly relevant and tailored to the user's specific context and needs. This method significantly enhances the user experience and productivity within the low-code platform by providing a seamless and intuitive way to access knowledge and insights.

Figure 6:
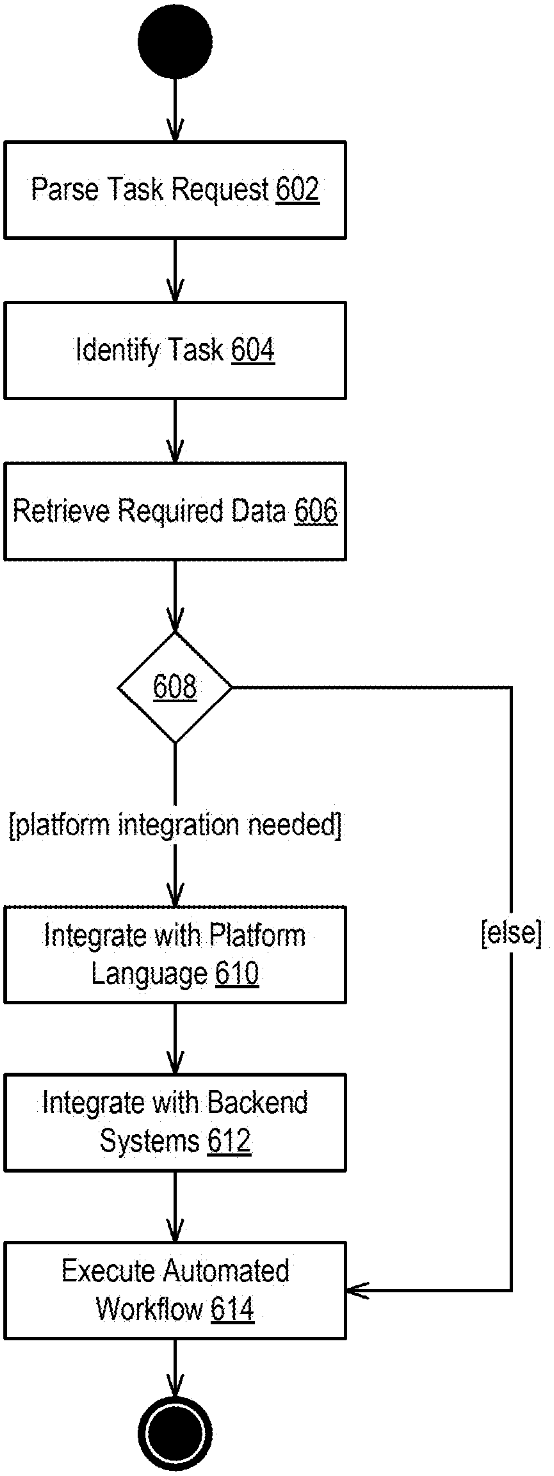
FIG. 6 is a flow diagram illustrating a method for automating tasks using the task automation component of the generative AI assistant according to some implementations.

FIG. 6 is a flow diagram illustrating a method for automating tasks using the task automation component of the generative AI assistant according to some implementations.

In step 602, the method parses the task request received from the user. The task request represents the natural language description of the task provided by the user, as described in FIG. 1 and FIG. 3. Parsing the task request involves analyzing the request and extracting key information, such as the intended action, relevant entities, and any specified parameters or constraints. The request parser 326 employed in this step utilizes advanced natural language understanding techniques to interpret the user's request accurately and handle a wide range of task descriptions. In some implementations, the request parser 326 may employ techniques such as intent recognition, named entity recognition, and semantic role labeling to extract the relevant information from the task request. The parsed task request provides a structured representation of the user's intent and the associated task details, which are used in subsequent steps to automate the task execution.

In step 604, the method identifies the specific task to be automated based on the parsed task request. The task identifier 328 utilized in this step leverages the knowledge base 114 to match the parsed request with predefined task templates or workflows. The knowledge base 114 contains a repository of task definitions, workflow templates, and domain-specific knowledge that is used to map the user's request to a specific task or workflow. The task identifier 328 employs advanced matching algorithms and natural language processing techniques to determine the most relevant task based on the user's request. In some implementations, the task identifier 328 may utilize techniques such as semantic similarity matching, rule-based matching, or machine learning-based classification to identify the appropriate task. The identified task serves as the basis for the subsequent steps in the automation process.

In step 606, the method retrieves the required data for executing the identified task. The data retriever 330 employed in this step gathers the necessary data and resources from various sources, including the knowledge base 114, external databases, or APIs. The data retriever 330 utilizes the task definition and any specified parameters or constraints to determine the specific data elements required for task execution. In some implementations, the data retriever 330 may employ techniques such as data mapping, data transformation, or data integration to ensure that the retrieved data is in the appropriate format and structure for the task execution. The retrieved data is then passed on to the subsequent steps for further processing and integration.

In step 608, the method determines if platform integration is needed for executing the identified task. This determination is based on the specific requirements of the task and the capabilities of the low-code platform. If the task involves interacting with the platform's proprietary programming language or specific components, platform integration is necessary. If platform integration is needed, the method proceeds to step 610. If platform integration is not required, the method proceeds directly to step 612 for backend systems integration.

In step 610, the method integrates with the platform language to execute the task. The platform language integrator 334 employed in this step enables the task automation component to interact with the low-code platform's proprietary programming language. The platform language integrator 334 provides a bridge between the task automation component and the proprietary runtime, allowing the automated tasks to be executed within the platform's native environment. In some implementations, the platform language integrator 334 may utilize techniques such as code generation, API integration, or language-specific adapters to facilitate the integration with the platform language.

In step 612, the method integrates with backend systems to execute the task. The backend systems integrator 336 employed in this step facilitates the integration between the task automation component and the various backend systems and services within the low-code platform. These backend systems may include databases, message queues, external APIs, or other platform-specific components. The backend systems integrator 336 handles the communication and data exchange between the task automation component and these backend systems, ensuring smooth and efficient execution of the automated tasks. In some implementations, the backend systems integrator 336 may utilize techniques such as API integration, data mapping, or protocol adapters to enable seamless integration with the backend systems.

In step 614, the method executes the automated workflow based on the identified task, retrieved data, and necessary integrations. The workflow executor 332 employed in this step orchestrates the execution of the various steps and actions defined in the task workflow. The workflow executor 332 leverages the platform language integrator 334 and the backend systems integrator 336 to interact with the low-code platform and backend systems, respectively. The execution of the automated workflow may involve a series of steps, such as data retrieval, data manipulation, conditional logic, and system interactions. In some implementations, the workflow executor 332 may employ techniques such as workflow orchestration, event-driven execution, or parallel processing to ensure efficient and reliable execution of the automated tasks.

The task automation method described in FIG. 6 provides a powerful and flexible approach to automating complex tasks and workflows within the low-code platform. By leveraging natural language processing, knowledge-based task identification, and seamless integration with the platform language and backend systems, the method enables users to automate repetitive and time-consuming tasks with ease. The automated execution of tasks reduces manual effort, improves efficiency, and allows users to focus on higher-value activities. Overall, this method significantly enhances the user experience and productivity within the low-code platform by providing a streamlined and intelligent approach to task automation.

Figure 7:
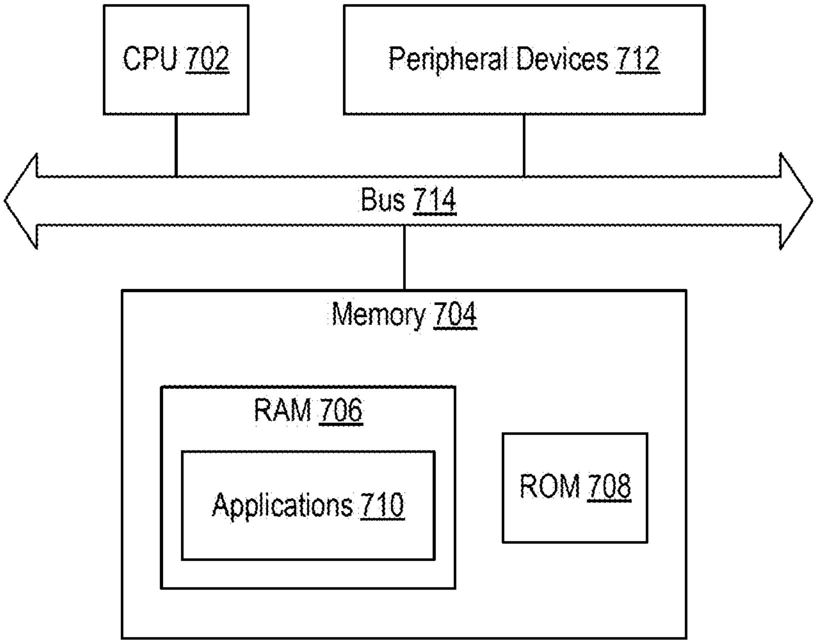
FIG. 7 is a block diagram of a computing device according to some embodiments of the disclosure.

FIG. 7 is a block diagram of a computing device according to some embodiments of the disclosure.

As illustrated, the device includes a processor or central processing unit (CPU) such as CPU 702 in communication with a memory 704 via a bus 714. The device also includes one or more input/output (I/O) or peripheral devices 712. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 702 may comprise a general-purpose CPU. The CPU 702 may comprise a single-core or multiple-core CPU. The CPU 702 may comprise a system-on-a-chip (SoC) or a similar embedded system. In some embodiments, a graphics processing unit (GPU) may be used in place of, or in combination with, a CPU 702. Memory 704 may comprise a memory system including a dynamic random-access memory (DRAM), static random-access memory (SRAM), Flash (e.g., NAND Flash), or combinations thereof. In one embodiment, the bus 714 may comprise a Peripheral Component Interconnect Express (PCIe) bus. In some embodiments, the bus 714 may comprise multiple busses instead of a single bus.

Memory 704 illustrates an example of a non-transitory computer storage media for the storage of information such as computer-readable instructions, data structures, program modules, or other data. Memory 704 can store a basic input/output system (BIOS) in read-only memory (ROM), such as ROM 708 for controlling the low-level operation of the device. The memory can also store an operating system in random-access memory (RAM) for controlling the operation of the device.

Applications 710 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 706 by CPU 702. CPU 702 may then read the software or data from RAM 706, process them, and store them in RAM 706 again.

The device may optionally communicate with a base station (not shown) or directly with another computing device. One or more network interfaces in peripheral devices 712 are sometimes referred to as a transceiver, transceiving device, or network interface card (NIC).

An audio interface in peripheral devices 712 produces and receives audio signals such as the sound of a human voice. For example, an audio interface may be coupled to a speaker and microphone (not shown) to enable telecommunication with others or generate an audio acknowledgment for some action. Displays in peripheral devices 712 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 712 may comprise any input device arranged to receive input from a user. An illuminator in peripheral devices 712 may provide a status indication or provide light. The device can also comprise an input/output interface in peripheral devices 712 for communication with external devices, using communication technologies, such as USB, infrared, Bluetooth®, or the like. A haptic interface in peripheral devices 712 provides tactile feedback to a user of the client device.

A GPS receiver in peripheral devices 712 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 7, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

receiving, by a processor, a natural language input from a user;

retrieving, by the processor, a plurality of semantically relevant results based on the natural language input;

classifying, by the processor, an intent of the natural language input using a first machine learning model;

selecting, by the processor, a second machine learning model based on the intent;

generating, by the processor, a prompt based on a type of the second machine learning model using the natural language input and the plurality of semantically relevant results;

inputting, by the processor, the prompt into the second machine learning model;

obtaining, by the processor, a result responsive to the prompt from the second machine learning model; and providing, by the processor, the result to the user.

2. The method of claim 1, wherein the second machine learning model is selected from a group consisting of a content generation model, a search and retrieval model, a questions and answers model, and a task automation model.

3. The method of claim 1, wherein the second machine learning model is a content generation model, and wherein obtaining the result from the content generation model comprises:

retrieving content using a retrieval-augmented generation (RAG) vector database, then forwarding to a large language model, the content associated with a target language, the target language comprising a form-based programming language;

generating an intermediate representation of the content; and transpiling the intermediate representation to the target language.

4. The method of claim 3, wherein transpiling the intermediate representation to the target language comprises converting the intermediate representation into syntax and semantics of a proprietary language.

5. The method of claim 1, wherein the second machine learning model is a search and retrieval model, and wherein obtaining the result from the search and retrieval model comprises:

parsing a query provided by the user;

expanding the query using semantically similar terms using word embeddings and ontology-based expansion;

retrieving relevant information based on the query using a vector proximity search algorithm; and ranking the relevant information if the relevant information is sufficient.

6. The method of claim 5, wherein expanding the query comprises identifying relevant terms and concepts based on the query and a knowledge base, and wherein ranking the relevant information comprises applying a ranking algorithm to prioritize the relevant information based on relevance to one or more of the query, user context, and information quality.

7. The method of claim 1, wherein the second machine learning model is a task automation model, and wherein obtaining the result from the task automation model comprises:

parsing a task request provided by the user;

identifying a task to be automated based on the task request using one or more of semantic similarity matching, rule-based parsing, or machine learning-based classification to match the task request to predefined task templates or workflows;

retrieving data required for executing the task; and executing an automated workflow based on the task, data, and at least one integration with a backend system.

8. The method of claim 7, wherein identifying the task to be automated comprises matching the task request with predefined task templates or workflows stored in a knowledge base, and wherein executing the automated workflow comprises orchestrating a series of steps, including data retrieval, data manipulation, conditional logic, and system interactions.

9. A non-transitory computer-readable storage medium for tangibly storing computer program instructions capable of being executed by a processor, the computer program instructions defining steps of:

receiving, by a processor, a natural language input from a user;

retrieving, by the processor, a plurality of semantically relevant results based on the natural language input;

classifying, by the processor, an intent of the natural language input using a first machine learning model;

selecting, by the processor, a second machine learning model based on the intent;

generating, by the processor, a prompt based on a type of the second machine learning model using the natural language input and the plurality of semantically relevant results;

inputting, by the processor, the prompt into the second machine learning model;

obtaining, by the processor, a result responsive to the prompt from the second machine learning model; and providing, by the processor, the result to the user.

10. The non-transitory computer-readable storage medium of claim 9, wherein the second machine learning model is selected from a group consisting of a content generation model, a search and retrieval model, a questions and answers model, and a task automation model.

11. The non-transitory computer-readable storage medium of claim 9, wherein the second machine learning model is a content generation model, and wherein obtaining the result from the content generation model comprises:

retrieving content using a retrieval-augmented generation (RAG) vector database, then forwarding to a large language model, the content associated with a target language, the target language comprising a form-based programming language;

generating an intermediate representation of the content; and transpiling the intermediate representation to the target language.

12. The non-transitory computer-readable storage medium of claim 11, wherein transpiling the intermediate representation to the target language comprises converting the intermediate representation into syntax and semantics of a proprietary language.

13. The non-transitory computer-readable storage medium of claim 9, wherein the second machine learning model is a search and retrieval model, and wherein obtaining the result from the search and retrieval model comprises:

parsing a query provided by the user;

expanding the query using semantically similar terms using word embeddings and ontology-based expansion;

retrieving relevant information based on the query using a vector proximity search algorithm; and ranking the relevant information if the relevant information is sufficient.

14. The non-transitory computer-readable storage medium of claim 13, wherein expanding the query comprises identifying relevant terms and concepts based on the query and a knowledge base, and wherein ranking the relevant information comprises applying a ranking algorithm to prioritize the relevant information based on relevance to one or more of the query, user context, and information quality.

15. The non-transitory computer-readable storage medium of claim 9, wherein the second machine learning model is a task automation model, and wherein obtaining the result from the task automation model comprises:

parsing a task request provided by the user;

identifying a task to be automated based on the task request using one or more of semantic similarity matching, rule-based parsing, or machine learning-based classification to match the task request to predefined task templates or workflows;

retrieving data required for executing the task; and executing an automated workflow based on the task, data, and at least one integration with a backend system.

16. A device comprising:

a processor; and a storage medium for tangibly storing thereon program logic for execution by the processor, the program logic comprising steps for:

receiving a natural language input from a user;

retrieving a plurality of semantically relevant results based on the natural language input;

classifying an intent of the natural language input using a first machine learning model;

selecting a second machine learning model based on the intent;

generating a prompt based on a type of the second machine learning model using the natural language input and the plurality of semantically relevant results;

inputting the prompt into the second machine learning model;

obtaining a result responsive to the prompt from the second machine learning model; and providing the result to the user.

17. The device of claim 16, wherein the second machine learning model is selected from a group consisting of a content generation model, a search and retrieval model, a questions and answers model, and a task automation model.

18. The device of claim 16, wherein the second machine learning model is a content generation model, and wherein obtaining the result from the content generation model comprises:

retrieving content using a retrieval-augmented generation (RAG) vector database, then forwarding to a large language model, the content associated with a target language, the target language comprising a form-based programming language;

generating an intermediate representation of the content; and transpiling the intermediate representation to the target language.

19. The device of claim 16, wherein the second machine learning model is a search and retrieval model, and wherein obtaining the result from the search and retrieval model comprises:

parsing a query provided by the user;

expanding the query using semantically similar terms using word embeddings and ontology-based expansion;

retrieving relevant information based on the query using a vector proximity search algorithm; and ranking the relevant information if the relevant information is sufficient.

20. The device of claim 16, wherein the second machine learning model is a task automation model, and wherein obtaining the result from the task automation model comprises:

parsing a task request provided by the user;

identifying a task to be automated based on the task request using one or more of semantic similarity matching, rule-based parsing, or machine learning-based classification to match the task request to predefined task templates or workflows;

retrieving data required for executing the task; and executing an automated workflow based on the task, data, and at least one integration with a backend system.

* * * * *